United States Patent
Messner et al.

(10) Patent No.: US 7,542,837 B2
(45) Date of Patent: Jun. 2, 2009

(54) DETERMINING THE MOMENT OF ACTIVATION OF AN AUTOMATIC HOLD FUNCTION

(75) Inventors: Heiner Messner, Möglingen (DE); Raphael Oliveira, Ilsfeld/Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 488 days.

(21) Appl. No.: 11/378,932

(22) Filed: Mar. 16, 2006

(65) Prior Publication Data

US 2006/0229771 A1 Oct. 12, 2006

(30) Foreign Application Priority Data

Apr. 6, 2005 (DE) .................. 10 2005 015 725

(51) Int. Cl.
*B60T 8/58* (2006.01)
*G06F 19/00* (2006.01)

(52) U.S. Cl. .................................. 701/70; 303/191
(58) Field of Classification Search .......... None
See application file for complete search history.

(56) References Cited

U.S. PATENT DOCUMENTS

| | | | | |
|---|---|---|---|---|
| 5,458,405 A | * | 10/1995 | Watanabe | 303/173 |
| 5,819,193 A | * | 10/1998 | Burgdorf et al. | 701/71 |
| 6,317,671 B1 | * | 11/2001 | Tsutsui et al. | 701/51 |
| 6,456,230 B2 | * | 9/2002 | Schwartz et al. | 342/71 |
| 6,814,414 B1 | * | 11/2004 | Schmitt et al. | 303/191 |
| 2003/0227215 A1 | * | 12/2003 | Kinder et al. | 303/3 |

* cited by examiner

*Primary Examiner*—Michael J. Zanelli
(74) *Attorney, Agent, or Firm*—Kenyon & Kenyon LLP

(57) ABSTRACT

A method for determining the moment of activation of an automatic hold function in vehicles. The optimum moment of activation may be determined precisely if the present vehicle speed is measured by wheel speed sensors, a future vehicle speed is calculated and the hold function is activated when the calculated future vehicle speed is lower than a predefined speed threshold.

20 Claims, 1 Drawing Sheet

DETERMINING THE MOMENT OF ACTIVATION OF AN AUTOMATIC HOLD FUNCTION

FIELD OF THE INVENTION

The present invention relates to a method for determining the moment of activation of an automatic hold function, and a braking system for vehicles with an automatic hold function.

BACKGROUND INFORMATION

The automatic hold function AVH (Automatic Vehicle Hold) is a supplementary braking function which assists the operator to hold the vehicle stationary. In that process the vehicle is braked automatically (i.e., without any need for the operator to press the brake pedal), until the operator presses the accelerator pedal again. The AVH function normally goes into action when the operator brakes the vehicle to a standstill, but it also acts in cases when the vehicle rolls to a standstill. Here, a critical point is detection that the vehicle has reached a standstill.

From the related art it is known that the stationary state of a vehicle can be detected through evaluation of information from wheel speed sensors. Conventional wheel speed sensors, however, have the disadvantage of providing a very inaccurate measurement signal at very low vehicle speeds, for example under 3 km/h. In addition, the measuring method (Hall effect sensor having a sensor wheel) of the wheel speed sensors commonly used causes the latter, rather than measuring the present vehicle speed, to measure a speed that is already in the past. As a result, the true present vehicle speed is generally not the same as the measured vehicle speed. The stationary state of the vehicle can thus not be determined with sufficient accuracy. In particular where the vehicle is rolling to a standstill uphill, the result may be that the automatic hold function is activated only when the vehicle is already rolling back down again. This is irritating and inconvenient for the operator. On the other hand, if the automatic hold function is activated permaturely, the vehicle is braked harshly.

Consequently, an object of the present invention is to determine the optimum moment for activation of the automatic hold function, namely when the vehicle reaches a standstill, as accurately as possible.

SUMMARY OF THE INVENTION

An important idea of the present invention is to calculate a future vehicle speed, which will be the speed of the vehicle after a period of time $\Delta T$, for example. The automatic hold function is then activated when the calculated future vehicle speed is lower than a predefined speed threshold. This predefined speed threshold is a function of the time needed to actuate the braking system and is typically set at a figure between 0 km/h and 2 km/h, or preferably between 0 km/h and 1 km/h. Under these conditions, the automatic hold function is therefore activated even before the vehicle has come to a standstill, in order to allow for the time needed to actuate the brake. This has the significant advantage that the brake of the vehicle takes effect precisely as the vehicle comes to a standstill and the vehicle is braked to a stop neither too early nor too late.

An advantageous embodiment of the present invention is characterized in that the present vehicle speed (v(t)) is measured by a sensor system, such as wheel speed sensors, and is inserted into the calculation of the future vehicle speed (v(t+$\Delta T$)). Determination of the present vehicle speed requires no significant additional effort or expenditure, since in modern vehicles it is generally already provided.

The future vehicle speed v(t+$\Delta T$) is preferably calculated on the basis of the vehicle's present acceleration. The vehicle's present acceleration can be ascertained from a balance of longitudinal forces, as follows:

$$a_{Fzg} = -a_{earth} \cdot \alpha + \frac{M_{Antr}}{r_{wheel} \cdot m_{Fzg}} - \frac{F_{Br}}{m_{Fzg}}$$

In the above, $a_{earth}$ is acceleration due to gravity, $M_{Antr}$ the driving torque, $r_{wheel}$ the wheel radius, $m_{Fzg}$ the vehicle mass, $F_{Br}$ the braking force and $\alpha$ the slope of the roadway. When the vehicle is rolling to a stop on a slope, braking force $F_{Br}$ is equal to zero.

The future speed after a period of time $\Delta T$ is expressed by:

$$v(t+\Delta T) = v(t) + a_{Fzg} \cdot \Delta T$$

where v(t) is the measured present vehicle speed and $\Delta T$ is a period of time, typically in the range between 0.1 s and 0.5 s.

According to the present invention the hold function AVH is activated when the calculated future vehicle speed v(t+$\Delta T$) is lower than a speed threshold $V_{SW}$. Thus:

$$v(t+\Delta T) < v_{SW}.$$

The speed threshold is preferably variable and is a function, for example, of the estimated deceleration of the vehicle. The speed threshold is preferably higher in the case of a sharper deceleration of the vehicle than in the case of a slighter deceleration. This allows the AVH function to be triggered earlier when the vehicle is decelerating more sharply, and later when the vehicle is decelerating more slowly.

A braking system according to the invention for vehicles having an automatic hold function AVH essentially includes an actuator, e.g., a hydraulic pump or an electric motor, to operate a brake, a control unit to control the actuator and a wheel speed sensor to measure the present vehicle speed. The control unit is configured in such a way that one or several of the functions or calculations described above may be carried out.

DETAILED DESCRIPTION

Figure 1:
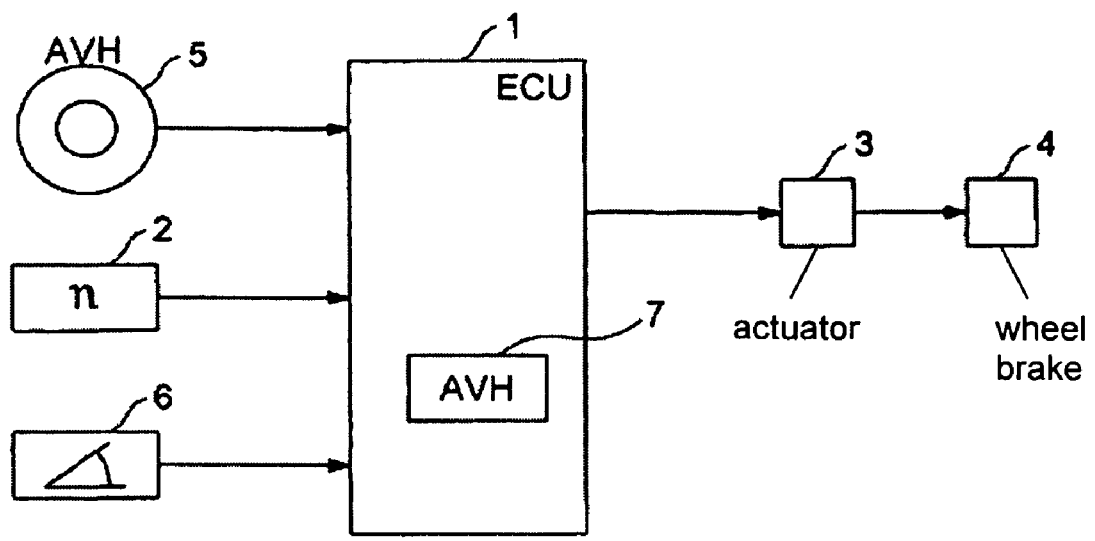
FIG. 1 shows a schematic representation of a braking system having an AVH function.

FIG. 1 shows a schematic block diagram of a braking system having an AVH (Automatic Vehicle Hold) function. This system essentially includes a control unit 1 having an AVH algorithm 7, an actuator 3 which may be activated by control unit 1, such as a hydraulic pump or electric motor, and a wheel brake 4. Also connected to control unit 1 are wheel speed sensors 2, a (pedal) transducer 6 for the accelerator pedal and an activation device (operator control element) 5 such as a pushbutton, to activate and/or deactivate the AVH function.

When the vehicle is rolling to a stop on a slope, shortly before the vehicle comes to a complete standstill control unit 1 activates actuator 3, in order to operate wheel brake 4 and hold the vehicle automatically. The moment of activation for this AVH function may, for example, be determined by a method shown in FIG. 2.

Figure 2:
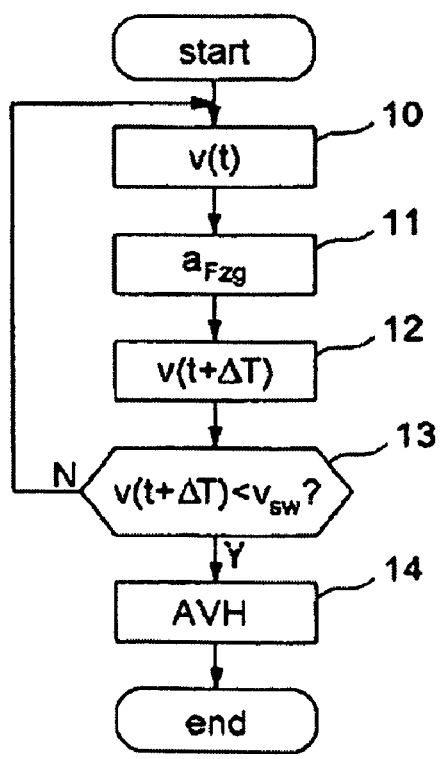
FIG. 2 shows the important method steps for determining a moment of activation of the AVH function.

FIG. 2 shows the important method steps for determining the moment of activation of the AVH function. First, in step 10 the present vehicle speed v(t) is ascertained from the signal given by wheel speed sensors 2. In step 11 the vehicle's present acceleration or deceleration $a_{Fzg}$ is then calculated, as follows:

$$a_{Fzg} = -a_{earth} \cdot \alpha + \frac{M_{Antr}}{r_{wheel} \cdot m_{Fzg}}$$

The variables $a_{earth}$ (acceleration due to gravity), $M_{Antr}$ (driving torque), $r_{wheel}$ (wheel radius), and $m_{Fzg}$ (vehicle mass) are known. Slope a may be ascertained, for example, by using a longitudinal accelerometer or it may be calculated mathematically using a slope estimation. The driving torque $M_{Antr}$ is known from engine and transmission information, which may be obtained, for example, from an engine control unit. Braking force $F_{Brems}$ is equal to zero when the vehicle is rolling to a stop.

The future vehicle speed v(t+ΔT) is then calculated in step 12, as follows:

$$v(t+\Delta T) = v(t) + a_{Fzg} \cdot \Delta T$$

where ΔT typically lies in the range between 0.1 s and 0.5 s.

Finally, step 13 examines whether the future vehicle speed v(t+ΔT) is lower than a speed threshold $v_{SW}$. If this is the case (Y), the AVH function is activated and actuator 3 is triggered in step 14. If not (N), a new speed calculation is performed.

In a preferred version of the method, speed threshold $v_{SW}$ is a function of the vehicle acceleration or deceleration $a_{Fzg}$. The AVH function is activated earlier in the case of a relatively sharp vehicle deceleration than in the case of softer deceleration. This permits allowance to be made for the time needed to activate the braking system.

What is claimed is:

1. A method for determining a moment of activation of an automatic hold function, comprising:
    ascertaining a vehicle acceleration;
    calculating a future vehicle speed on the basis of the vehicle acceleration; and
    activating the hold function when the calculated future vehicle speed falls below a predefined speed threshold.

2. The method according to claim 1, further comprising measuring a present vehicle speed by a sensor system, and wherein the future vehicle speed is calculated as a function of the present vehicle speed.

3. The method according to claim 1, further comprising measuring a present vehicle speed by wheel speed sensors, and wherein the future vehicle speed is calculated as a function of the present vehicle speed.

4. The method according to claim 1, wherein the vehicle acceleration $a_{Fzg}$ is calculated using an equation $$a_{Fzg} = -a_{earth} \cdot \alpha + \frac{M_{Antr}}{r_{wheel} \cdot m_{Fzg}}.$$

5. The method according to claim 1, wherein a period of time between a present time and a time that the future vehicle speed is reached lies in a range between 0.1 s and 0.5 s.

6. A method for determining a moment of activation of an automatic hold function, comprising:
    calculating a future vehicle speed v(t+ΔT) according to the following relationship: v(t+ΔT)=v(t)+$a_{Fzg}$·ΔT; and
    activating the hold function when the calculated future vehicle speed falls below a predefined speed threshold.

7. The method according to claim 6, wherein a period of time ΔT lies in a range between 0.1 s and 0.5 s.

8. The method according to claim 6, further comprising measuring a present vehicle speed by a sensor system, wherein the future vehicle speed is calculated as a function of the present vehicle speed.

9. The method according to claim 8, wherein a period of time ΔT lies in a range between 0.1 s and 0.5 s; and
    wherein the vehicle acceleration $a_{Fzg}$ is calculated using an equation $$a_{Fzg} = -a_{earth} \cdot \alpha + \frac{M_{Antr}}{r_{wheel} \cdot m_{Fzg}}.$$

10. The method according to claim 6, further comprising measuring a present vehicle speed by wheel speed sensors, wherein the future vehicle speed is calculated as a function of the present vehicle speed.

11. The method according to claim 10, wherein a period of time ΔT lies in a range between 0.1 s and 0.5 s; and
    wherein the vehicle acceleration $a_{Fzg}$ is calculated using an equation $$a_{Fzg} = -a_{earth} \cdot \alpha + \frac{M_{Antr}}{r_{wheel} \cdot m_{Fzg}}.$$

12. The method according to claim 6, wherein the vehicle acceleration $a_{Fzg}$ is calculated using an equation $$a_{Fzg} = -a_{earth} \cdot \alpha + \frac{M_{Antr}}{r_{wheel} \cdot m_{Fzg}}.$$

13. A method for determining a moment of activation of an automatic hold function, comprising:
    calculating a future vehicle speed; and
    activating the hold function when the calculated future vehicle speed falls below a predefined speed threshold;
    wherein the speed threshold is a function of a vehicle acceleration.

14. The method according to claim 13, further comprising measuring a present vehicle speed by a sensor system, wherein the future vehicle speed is calculated as a function of the present vehicle speed.

15. The method according to claim 13, further comprising measuring a present vehicle speed by wheel speed sensors, wherein the future vehicle speed is calculated as a function of the present vehicle speed.

16. The method according to claim 13, wherein the vehicle acceleration $a_{Fzg}$ is calculated using an equation $$a_{Fzg} = -a_{earth} \cdot \alpha + \frac{M_{Antr}}{r_{wheel} \cdot m_{Fzg}}.$$

17. A braking system for a vehicle having an automatic hold function, comprising:

an actuator; and a control unit linked with the actuator, the control unit configured to determine a moment of activation of the automatic hold function by:

ascertaining a vehicle acceleration;

calculating a future vehicle speed on the basis of the vehicle acceleration; and activating the hold function when the calculated future vehicle speed is lower than a speed threshold.

18. The system according to claim 17, further comprising a wheel speed sensor for measuring a present vehicle speed, which is inserted into the calculation of the future vehicle speed.

19. The system according to claim 17, further comprising;

a speed sensor for measuring a present vehicle speed, which is inserted into the calculation of the future vehicle speed.

20. The system according to claim 17, wherein the vehicle acceleration $a_{Fzg}$ is calculated using an equation $$a_{Fzg} = -a_{earth} \cdot \alpha + \frac{M_{Antr}}{r_{wheel} \cdot m_{Fzg}}.$$

* * * * *